US011597601B2

(12) United States Patent
Vander Bent, Jr.

(10) Patent No.: US 11,597,601 B2
(45) Date of Patent: Mar. 7, 2023

(54) FENESTRATION LOWERING DEVICE

(71) Applicant: PGT Innovations, Inc., North Venice, FL (US)

(72) Inventor: Kenneth John Vander Bent, Jr., Bradenton, FL (US)

(73) Assignee: PGT Innovations, Inc., North Venice, FL (US)

( * ) Notice: Subject to any disclaimer, the term of this patent is extended or adjusted under 35 U.S.C. 154(b) by 1013 days.

(21) Appl. No.: 16/369,089

(22) Filed: Mar. 29, 2019

(65) Prior Publication Data

US 2020/0307914 A1   Oct. 1, 2020

(51) Int. Cl.
*E04F 21/00* (2006.01)
*B66F 9/04* (2006.01)
*B65G 7/12* (2006.01)

(52) U.S. Cl.
CPC .............. *B65G 7/12* (2013.01); *B66F 9/04* (2013.01); *E04F 21/0007* (2013.01); *E05Y 2900/132* (2013.01); *E05Y 2900/148* (2013.01)

(58) Field of Classification Search
CPC ...... B66F 9/04; B66F 9/02; B66F 7/16; B66F 7/18; B66F 3/24; B66F 3/247; B66B 9/04; B62B 3/0618; E04F 21/0007
See application file for complete search history.

(56) References Cited

U.S. PATENT DOCUMENTS 5,269,501 A * 12/1993 Liegel ................. B66F 9/18
212/292
2002/0110447 A1* 8/2002 Stone ................. B66F 9/04
414/609

* cited by examiner

*Primary Examiner* — Tyrone V Hall, Jr.
(74) *Attorney, Agent, or Firm* — Taylor English Duma LLP

(57) ABSTRACT

Example aspects of a fenestration-lowering device and a method for using a fenestration-lowering device are disclosed. The fenestration-lowering device can include a frame; a support platform configured to move relative to the frame; and a hydraulic lowering mechanism configured to move the support platform. The method for using the fenestration-lowering device can include providing a hydraulic lowering mechanism for moving a support platform of the fenestration-lowering device from a raised orientation to a lowered orientation; setting a fenestration product on the support platform in the raised orientation; activating the hydraulic lowering mechanism to move the support platform from the raised orientation to the lowered orientation; and removing the fenestration product from the support platform.

18 Claims, 4 Drawing Sheets

FENESTRATION LOWERING DEVICE

TECHNICAL FIELD

This disclosure relates to fenestration. More specifically, this disclosure relates to a device for lowering fenestration to from a first elevation to a second elevation.

BACKGROUND

Fenestration includes doors, windows, vents, and other products configured to be set into openings of a building. Fenestration, and particularly doors and windows, can be heavy and difficult to maneuver. Typically, removing a fenestration product from a delivery vehicle requires lowering the fenestration product from the bed of the delivery vehicle to the ground or floor. Various equipment, such as a forklift and/or a lift gate, is often used in lowering the fenestration product. However, because this equipment is not intentionally designed for maneuvering fenestration, the process can be slow and/or can risk damaging the fenestration product. Furthermore, operators typically must manually assist in the process, which can pose a risk for injury.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a fenestration-lowering device comprising a frame; a support platform configured to move relative to the frame; and a hydraulic lowering mechanism configured to move the support platform.

Also disclosed is a fenestration-lowering device comprising a frame; a support platform configured to move relative to the frame between a raised orientation and a lowered orientation; a hydraulic lowering mechanism configured to move the support platform from the raised orientation to the lowered orientation; and a spring return mechanism configured to move the support platform from the lowered orientation to the raised orientation.

Also disclosed is a method for using a fenestration-lowering device comprising providing a hydraulic lowering mechanism for moving a support platform of the fenestration-lowering device from a raised orientation to a lowered orientation; setting a fenestration product on the support platform in the raised orientation; activating the hydraulic lowering mechanism to move the support platform from the raised orientation to the lowered orientation; and removing the fenestration product from the support platform.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
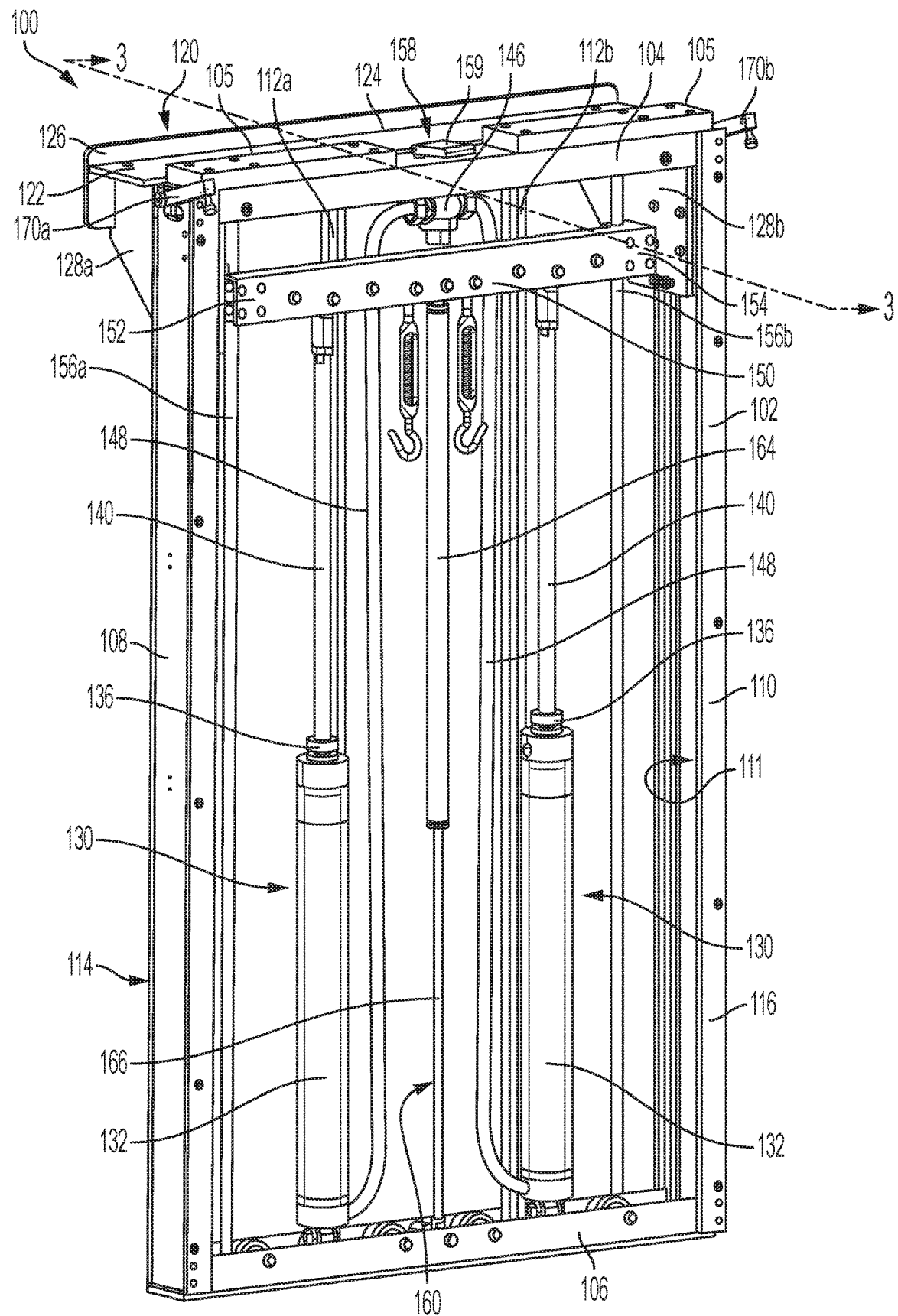
FIG. 1 is a top perspective view of a fenestration-lowering device, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a fenestration-lowering device and associated methods, systems, devices, and various apparatus. Example aspects of the fenestration-lowering device can comprise a support platform movable between a raised orientation and a lowered orientation. The fenestration-lowering device can further comprise hydraulic lowering mechanism for moving the support platform. It would be understood by one of skill in the art that the disclosed fenestration-lowering device is described in but a few exemplary aspects among many. No particular terminology or description should be considered limiting on the disclosure or the scope of any claims issuing therefrom.

FIGS. 1-7 illustrates a first aspect of a fenestration-lowering device 100 according to the present disclosure. Referring to FIG. 1, as shown, the fenestration-lowering device 100 can comprise a frame 102 and a support platform 120 movable relative to the frame 102. Example aspects of the frame 102 can be generally rectangular in shape, as shown; however, other aspects of the frame 102 can define any other suitable shape known in the art, such as, for example, a triangle, semi-circle, pentagon, and the like. As shown, the frame 102 can comprise an upper frame member 104, a lower frame member 106, a first side frame member 108, and a second side frame member 110. Some aspects of the frame 102 can also comprise one or more reinforcement members 112—for example, a first reinforcement member 112a and a second reinforcement member 112b—extending between the upper frame member 104 and lower frame member 106. Example aspects of the frame 102 can be formed from a metal material, such as steel, while other aspects can be formed from any other suitable material, including, but not limited to, other metal materials, such as aluminum or iron, plastic, composites, and the like.

Figure 7:
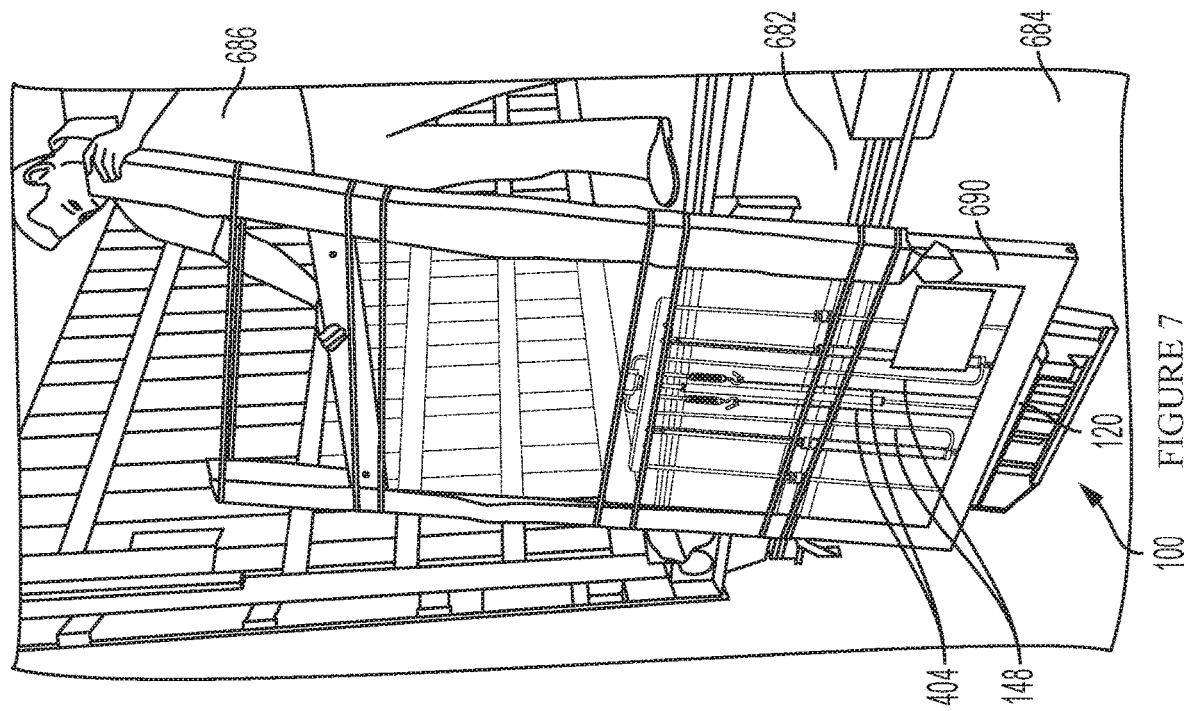
FIG. 7 is a perspective view of the fenestration-lowering device of FIG. 1 in use, wherein the support platform of the fenestration-lowering device is in a lowered orientation.

According to example aspects, the support platform 120 can be movable between a raised orientation, as shown in FIGS. 1-6, and a lowered orientation, as shown in FIG. 7. Example aspects of the support platform 120 can extend about from the first side frame member 108 to second side frame member 110. Other aspects of the support platform 120 can be longer or shorter. As shown, the support platform 120 can define an upper support surface 122 on which a fenestration product 690 (shown in FIG. 6) can be supported. The upper support surface 122 can extend outward from a back side 114 of the frame 102 and can be oriented about perpendicular to the frame 102. The support platform 120 can also comprise a ridge 126 extending generally upward, relative to the orientation shown, from a back end 124 of the upper support surface 122. The ridge 126 can aid in preventing the fenestration product 690 from slipping off the back end 124 of the upper support surface 122 when supported thereon.

The support platform 120 can further comprise a pair of support mounts 128a,b extending generally downward from the upper support surface 122, relative to the orientation shown. The support mounts 128a,b can be movably mounted to the first and second side frame member 108,110. For example, a portion of the support mount 128a can slidably engage a first groove 409 (shown in FIG. 4) of the first side frame member 108, and a portion of the support mount 128b can slidably engage a second groove 111 of the second side frame member 110. Example aspects of the support mounts 128a,b can be configured to slide vertically up and down along the first and second side frame members 108,110, relative to the orientation shown, to move the support platform 120 between the raised orientation, as shown, and the lowered orientation. In the raised orientation, the support platform 120 can generally be oriented proximate the upper frame member 104, and in the lowered orientation, the support platform 120 can generally be oriented proximate the lower frame member 106.

Example aspects of the fenestration-lowering device 100 can further comprise a pair of hydraulic lowering mechanisms 130 for lowering the support platform 120 from the raised orientation to the lowered orientation. As illustrated, each of the hydraulic lowering mechanisms 130 can comprise a cylinder 132 and a piston 140 that is configured to slide relative to the cylinder 132. Other aspects of the fenestration-lowering device 100 can comprise more or fewer hydraulic lowering mechanisms 130. Each of the hydraulic lowering mechanisms 130 can extend between a movable crossbar 150 and the lower frame member 106. According to example aspects, each of the pistons 140 can extend upward from the corresponding cylinder 132, relative to the orientation shown. The cylinder 132 can be secured to the lower frame member 106 and the piston 140 can be secured to the crossbar 150. In other aspects, the orientation of the piston 140 and cylinder 132 can be reversed, and the cylinder 132 can be slidable relative to the piston 140.

Example aspects of the crossbar 150 can define a first crossbar end 152 and a second crossbar end 154. The crossbar 150 can be movably mounted to a first guide rod 156a at its first crossbar end 152 and can be movably mounted to a second guide rod 156b at its second crossbar end 154. Each of the first and second guide rods 156a,b can extend between the upper and lower frame members 104, 106, as shown. In the depicted example aspect, the first guide rod 156a can be oriented between the first side frame member 108 and the first reinforcement member 112a, and the second guide rod 156b can be oriented between the second side frame member 110 and the second reinforcement member 112b. According to example aspects, the crossbar 150 can be operatively connected by a pulley system 400 (shown in FIGS. 4 and 5) to the support platform 120, such that the support platform 120 can slide from the raised orientation to the lowered orientation as the crossbar 150 slides downward on the first and second guide rods 156a,b.

Each of the cylinders 132 can define an interior chamber 338 (shown in FIG. 3) within which a working fluid can be received. Example aspects of the working fluid can be a gas such as air, a hydraulic fluid such as oil or water, or any other suitable working fluid or combination of working fluids known in the art. A valve 146 can be provided for controlling the passage of the working fluid between a lower reservoir 340 (shown in FIG. 3) of the chamber 338 and an upper reservoir 341 (shown in FIG. 3) of the chamber 338 in a controlled state. In example aspects, each of the hydraulic lowering mechanisms 130 can also comprise a tube 148, as shown, for connecting the valve 146 to each of the chambers 338 of the cylinders 132. An orifice 349 (shown in FIG. 3) can be formed in each cylinder 132 at the lower reservoir 340, and the corresponding tube 148 can be connected to the cylinder 132 at the orifice 349. Example aspects of the valve 146 can be oriented in a closed position, wherein pressure within the hydraulic lowering mechanisms 130 can prevent the working fluid from flowing from the lower reservoir 340 to the upper reservoir 341, and an open position, wherein the pressure within the hydraulic lowering mechanisms 130 can be reduced, such that the working fluid can be permitted to flow from the lower reservoir 340 to the upper reservoir 341. In other aspects, each of the hydraulic lowering mechanisms 130 can comprise a separate valve 146 for independently controlling the passage of the working fluid from the corresponding lower reservoir 340 of the chamber 338 into the corresponding upper reservoir 341 of the chamber 338. Furthermore, in other aspects, a single tube 148 can service both of the hydraulic lowering mechanisms 130.

When the valve 146 is in the closed position, the working fluid can be prevented from passing from the lower reservoir 340 to the upper reservoir 341. However, when the valve 146 is in the open position, pressure within the hydraulic lowering mechanisms 130 can be reduced and the working fluid can flow from the lower reservoir 340 to the upper reservoir 341. The opening of the valve 146 can be controlled by a first actuator 158, such as a first foot pedal 159. In other aspects, the first actuator 158 can be another suitable actuation mechanism, such as a button, switch, knob, or the like, that can be provided for opening the valve 146. Example aspects of the first actuator 158 can be located on or proximate to the upper frame member 104, as shown. In some aspects, one or more skid plates 105 can also be located on the upper frame member 104. However, in other aspects, the first actuator 158 can be located proximate the lower frame member 106, or at any other suitable location.

The mechanical load (e.g., the weight) of a fenestration product 690 (shown in FIG. 6) on the support platform 120 can apply a force to the support platform 120. The force can be transferred to the pistons 140 through the pulley system 400, and each piston 140 can bear down on the working fluid in the lower reservoir 340 corresponding chamber 338, increasing the pressure in the corresponding hydraulic lowering mechanism 130. When the valve 146 is moved to the open position and pressure in the hydraulic lowering mechanism 130 is reduced, the mechanical load can push the pistons 140 downward, relative to the orientation shown, which can force the working fluid upward around the pistons 140 and into the corresponding upper reservoir 341. As the working fluid flows out of the lower reservoir 340 and into the upper reservoir 341, each of the pistons 140 can slide downward, relative to the orientation shown, and further into the corresponding chamber 338 through an opening 334 (shown in FIG. 3) at a top end 136 of the cylinder 132. As described above, the pistons 140 can be attached to the crossbar 150, and as such, as the pistons 140 are lowered, the crossbar 150 can slide along the first and second guide rods 156a,b towards the top end 136 of the cylinders 132. The crossbar 150 can be operatively connected to the support platform 120 by the pulley system 400 (shown in FIG. 4) such that the support mounts 128a,b of the support platform 120 can slide along the first and second side frame members 108, 110 from the raised orientation to the lowered orientation as the crossbar 150 is lowered by the hydraulic lowering mechanisms 130.

According to example aspects, when the valve 146 is closed again, pressure in the hydraulic lowering mechanisms 130 can be increased, preventing each of the pistons 140 from further lowering into the chamber 338 and ceasing the flow of the working fluid from the lower reservoir 340 to the upper reservoir 341. As such, as the support platform 120 is being lowered from the raised orientation to the lowered orientation, the support platform 120 can be selectively locked in place at any time by disengaging the first actuator 158, which can close the valve 146.

The fenestration-lowering device 100 can further comprise a spring return mechanism 160 for returning the support platform 120 to the raised orientation from the lowered orientation. In some aspects, the spring return mechanism 160 can be a gas spring return, as shown, while in other aspects, the spring return mechanism 160 can be a mechanical spring return. Example aspects of the spring return mechanism 160 can comprise a spring cylinder 164 and a spring piston 166. The spring return mechanism 160 can extend between the crossbar 150 and the lower frame member 106, and can be oriented between the pair of hydraulic lowering mechanisms 130, as shown. In the present aspect, the spring piston 166 can be attached to the lower frame member 106 and can extend upward therefrom, relative to the orientation shown. The spring cylinder 164 can be attached to and extend between the spring piston 166 and the crossbar 150 and a gas can be housed within the spring cylinder 164. In other aspects, the orientation of the spring cylinder 164 and the spring piston 166 can be reversed.

As the working fluid flows from the lower reservoir 340 to the upper reservoir 341, thereby moving the support platform 120 from the raised orientation to the lowered orientation, the gas within the spring cylinder 164 can be compressed by the spring piston 146. When the mechanical load of the fenestration product 690 (shown in FIG. 6) is removed from the support platform 120 and the valve 146 is opened, the compressed air within the spring cylinder 164 expand to bias the spring piston 166 upward. As the spring piston 166 is connected to the crossbar 150, the crossbar 150 can also be biased upward, which in turn can bias the support platform 120 back to the raised orientation. As the support platform 120 is raised, the pistons 140 can be raised out of the corresponding chambers 338, and the working fluid can forced around the pistons 140 from the upper reservoir 341 and into the lower reservoir 340. Upon the support platform 120 returning to the raised orientation, the valve 146 can be closed, either automatically or by an operator, such as a first operator 686 (shown in FIG. 6).

Thus, an example method for operating the fenestration-lowering device 100 can comprise providing at least one of the hydraulic lowering mechanisms 130 and the spring return mechanism 160, operating the hydraulic lowering mechanism 130 to move the support platform 120 of the fenestration-lowering device 100 from a raised orientation to a lowered orientation, and operating the spring return mechanism 160 to move the support platform 120 from the lowered orientation to the raised orientation. Operating the hydraulic lowering mechanism 130 to move the support platform 120 of the fenestration-lowering device 100 from a raised orientation to a lowered orientation can comprise opening the valve 146, moving the working fluid from lower reservoir 340 to the upper reservoir 341, lowering the piston 140 into the chamber 338, and compressing the gas within the spring cylinder 164. Operating the spring return mechanism 160 can comprise expanding the air within the spring cylinder 164, moving the working fluid from the upper reservoirs 341 to the lower reservoirs 340, raising the pistons 140 within the chambers 338, and closing the valve 146.

Figure 2:
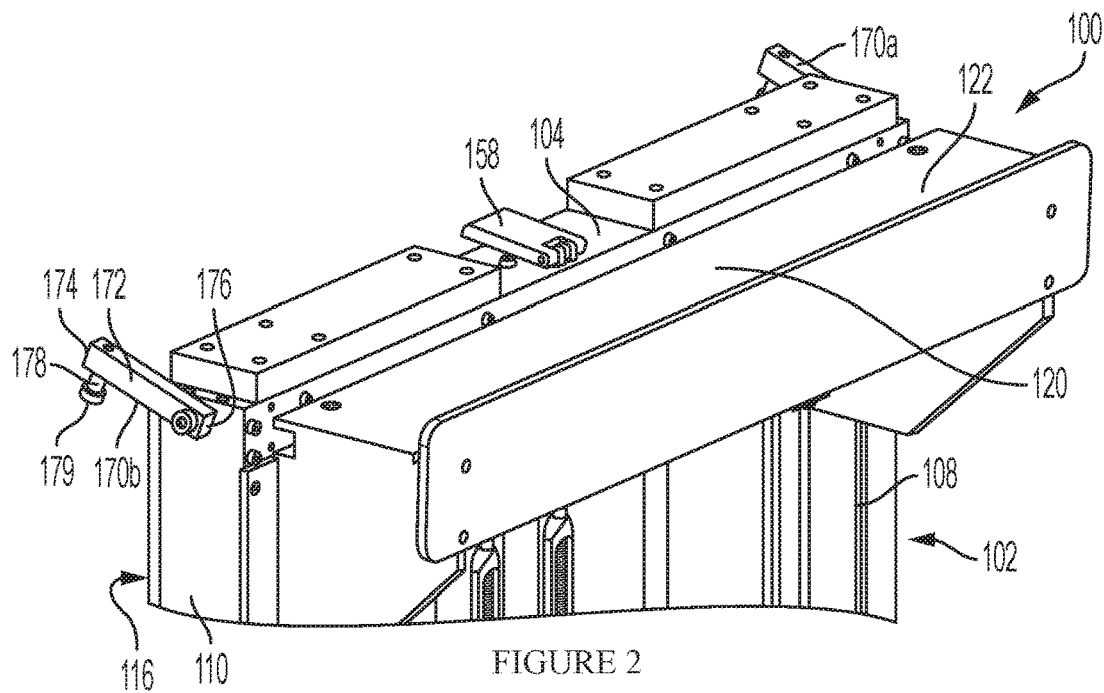
FIG. 2 is a top perspective view of a top end of the fenestration-lowering device of FIG. 1.

Example aspects of the fenestration-lowering device 100 can also comprise a pair of frame supports 170a,b for propping the fenestration-lowering device 100 on a generally horizontal vehicle bed 682 (shown in FIG. 6) of a delivery vehicle 680 (shown in FIG. 6) such as a tractor-trailer, or another horizontal elevated surface. Other aspects can comprise more or fewer frame supports 170. As shown in FIG. 2, the frame support 170a can be attached to the first side frame member 108 proximate the upper frame member 104, and the frame support 170b can be attached to the second side frame member 110 proximate the upper frame member 104. Each of the frame supports 170a,b can comprise an arm 172 extending outward from a front side 116 of the frame 102 and a leg 178 extending generally downward from a distal end 174 of the arm 172, relative to the orientation shown. The leg 178 can be configured to engage the bed 682 of the delivery vehicle 680 (shown in FIG. 6) or other elevated surface to support and stabilize the fenestration-lowering device 100 during operation. Some example aspects of the leg 178 can comprise a non-slip material, such as a rubber pad 179, configured to strengthen the grip between the leg 178 and the vehicle bed 682. According to aspects, the frame supports 170a,b can movable between a deployed position, as shown, and a folded position relative to the frame 102. For example, a proximal end 176 of each arm 172 can be pivotably attached to the corresponding first or second side frame member 108,110 to allow movement between the folded and deployed positions.

With the frame 102 orientated in a generally vertical orientation, as shown, example aspects of the leg 178 of each frame support 170a,b can be oriented at an angle relative to vertical in the deployed position. As such, when the frame supports 170a,b engage the horizontal vehicle bed 682 or other horizontal elevated support surface, the frame 102 and the upper support surface 122 of the support platform 120 can be orientated at an angle relative to vertical. Orienting the upper support surface 122 at an angle can allow for a safer and more controlled lowering of the fenestration product 690, as will be described in further detail below with reference to FIGS. 6 and 7.

Figure 3:
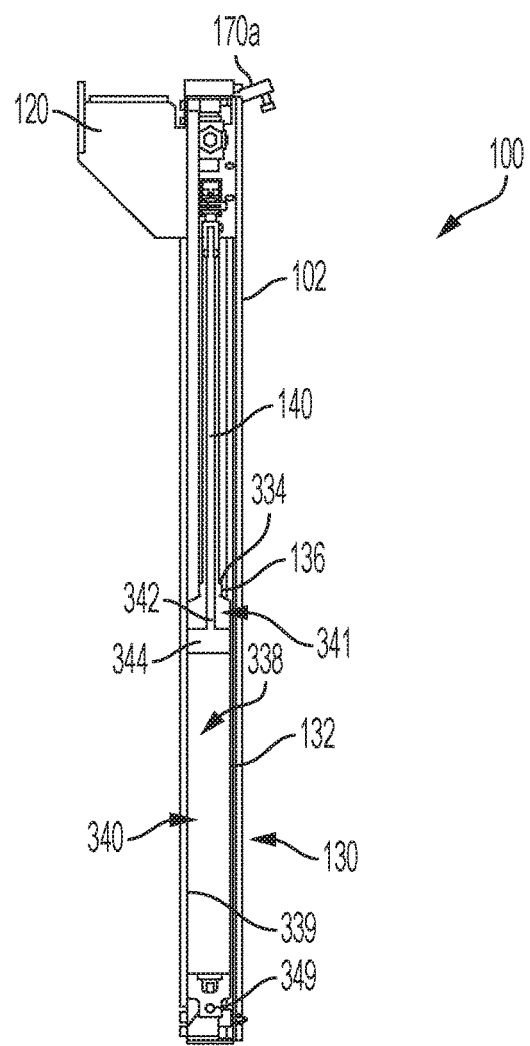
FIG. 3 is a cross-sectional view of the fenestration-lowering device of FIG. 1 taken along line 3-3 in FIG. 1.

FIG. 3 illustrates a cross-sectional view of the fenestration-lowering device 100 taken along line 3-3 in FIG. 1, wherein the support platform 120 is in the raised orientation. The cross-section intersects the cylinder 132 of one of the hydraulic lowering mechanisms 130, such that the chamber 338 within the cylinder 132 is visible, along with the lower reservoir 340 and upper reservoir 341. As shown, a lower end 342 of the piston 140 can extend through the opening 334 at the top end 136 of the cylinder 132 and into the chamber 338. Some aspects of the piston 140 can define a cylindrical flange 344 at the lower end 342 that can engage an interior wall 339 of the chamber 338. The cylindrical flange 344 can include a sliding mechanism, such as an O-ring, to facilitate the piston 140 sliding within the chamber 338. In the raised orientation, as shown, the lower reservoir 340 of the chamber 338 can be filled with the working fluid and pressure within the tube/chamber system can maintain the flange 344 in position at the top end 136 of the cylinder 132. When the pressure is released and the working fluid can move from the lower reservoir 340 to the upper reservoir 341, the flange 344 can slide along the interior wall 339 of the chamber 338, lowering the piston 140.

Figure 4:
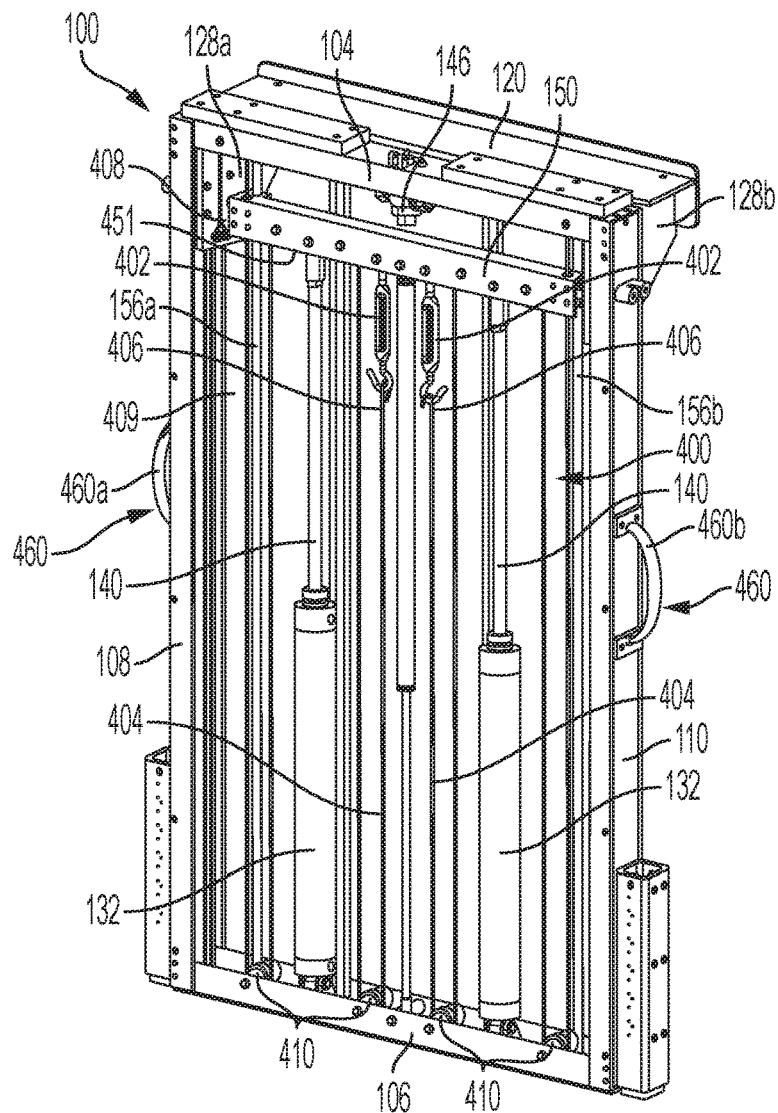
FIG. 4 is another top perspective view of the fenestration-lowering device of FIG. 1.
Figure 5:
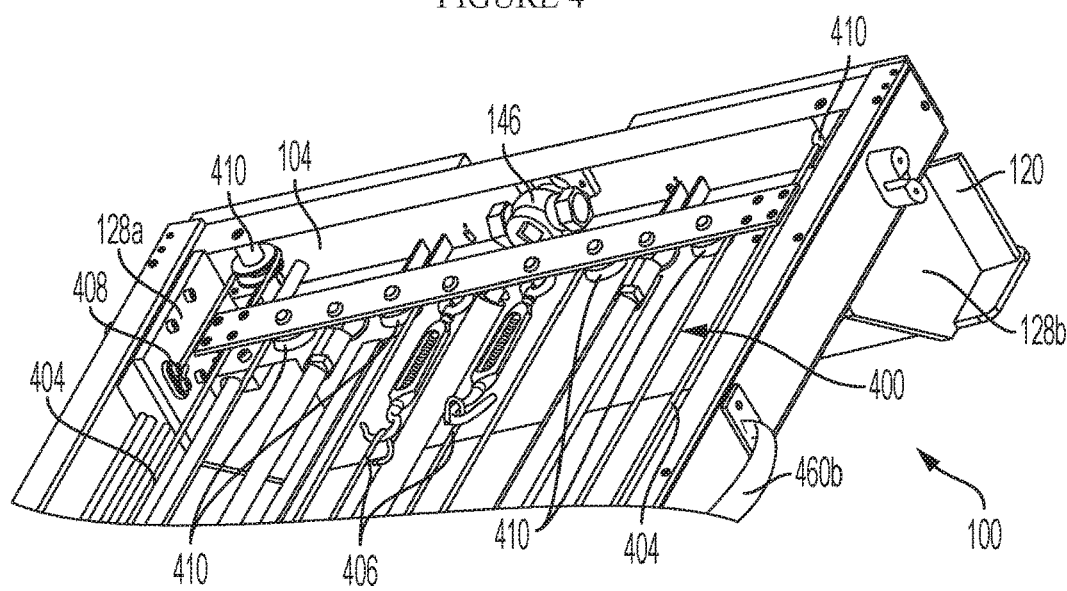
FIG. 5 is a bottom perspective view of the top end of the fenestration-lowering device of FIG. 1.

FIGS. 4 and 5 illustrate an example aspect of the pulley system 400 of the fenestration-lowering device 100. In the present Figures, the tubes 148 (shown in FIG. 1) are removed so that the pulley system 400 can be clearly seen. The pulley system 400 can be configured to operatively connect the support platform 120 to the crossbar 150, such that the support platform 120 can slide from the raised orientation to the lowered orientation as the crossbar 150 slides downward on the first and second guide rods 156a,b. As shown, a pair of hooks 402 can be connected to the crossbar 150. In the present aspect, the hooks 402 can hang down from a bottom side 451 of the cross bar 150. A first end 406 of a cable 404 can be attached to each of the hooks 402, as shown. Each of the cables 404 can be configured to engage an independent series of pulleys 410. A second end 408 of each cable 404 opposite from the first end 406 can engage a corresponding one of the support mounts 128a,b, of the support platform 120, as illustrated. In the present aspect, the pulleys 410 can be positioned on the crossbar 150, the upper frame member 104, and the lower frame member 106. In other aspects, the pulleys 140 can be positioned at other suitable locations. Furthermore, in other aspects, the cables 404 can be replaced with belts, ropes, or any other suitable drive element known in art.

Thus, according to example aspects, the valve 146 can be moved to the open position by actuating the first actuator 158, to reduce the pressure in the hydraulic lowering mechanisms 130 and to allow the working fluid to flow from the lower reservoir 340 to the upper reservoir 341. The pistons 140 can lower into the corresponding chambers 338, and the crossbar can be slide downward on the first and second guide rods 156a,b. As the crossbar 150 slides downward, the cables 404 of the pulley system 400 can pull the support platform 120 downward from the raised orientation to the lowered orientation.

Example aspects of the fenestration-lowering device 100 can further comprise one or more handles 460, as shown, to facilitate carrying and otherwise maneuvering the fenestration-lowering device 100. For example, a first handle 460a can be connected to the first side frame member 108, and a second handle 460b can be connected to the side frame member 110.

Figure 6:
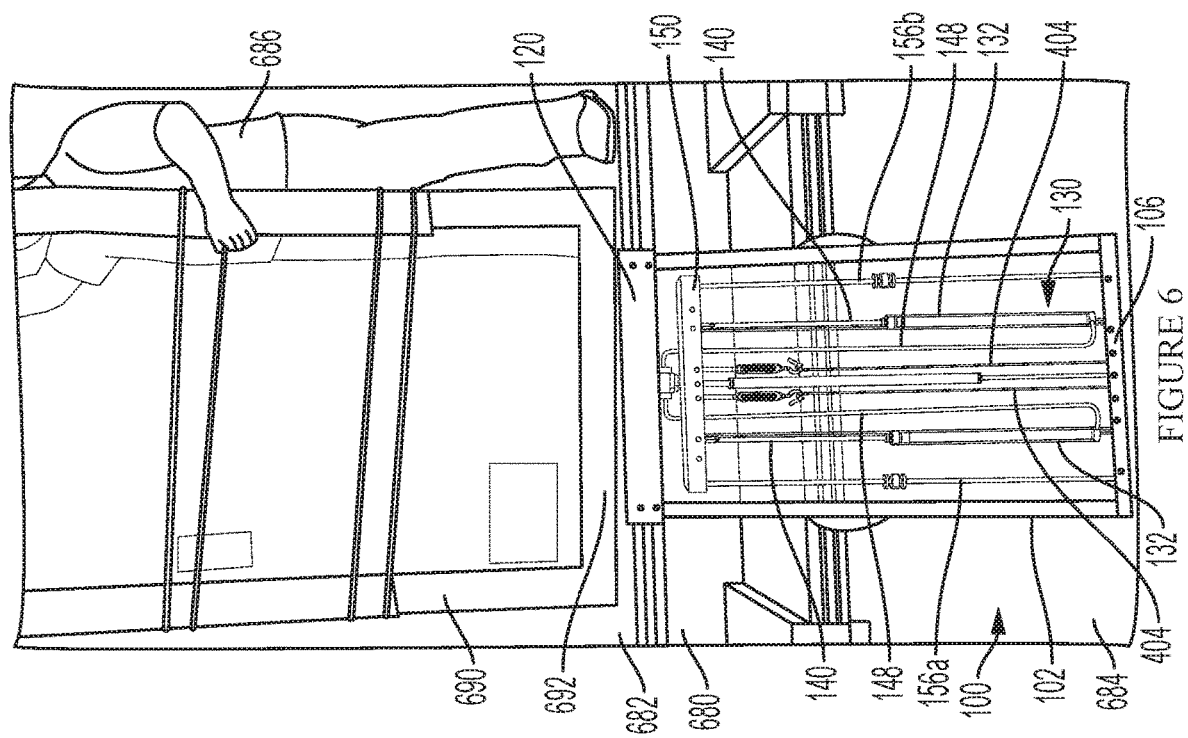
FIG. 6 is a front perspective view of the fenestration-lowering device of FIG. 1 in use, wherein a support platform of the fenestration-lowering device is in a raised orientation.

FIGS. 6 and 7 illustrates the fenestration-lowering device 100 in use. The fenestration-lowering device 100 can be used, for example, for lowering a fenestration product 690 from an elevated support surface, such as the vehicle bed 682 of the delivery vehicle 680, to a ground surface 684 or floor. Referring to FIG. 6, the support platform 120 is in the raised orientation and the frame supports 170a,b (shown in FIG. 1) can engage the vehicle bed 682 of the delivery vehicle 680 to support the fenestration-lowering device 100 on the bed 682 and to orient the fenestration-lowering device 100 at an angle relative to vertical. According to example aspects, the first operator 686 can set the fenestration product 690 on the upper support surface 122 (shown in FIG. 1) of the support platform 120. For example, the first operator 686 can stand on the bed 682 of the delivery vehicle 680, retrieve the fenestration product 690 from inside the delivery vehicle 680, and can set a bottom end 692 of the fenestration product 690 on the upper support surface 122. Orienting the support platform 120 at an angle can allow for a safer and more controlled lowering of the fenestration product 690, as the fenestration product 690 can be inclined to lean towards the back side 114 (shown in FIG. 1) of the frame 102 and towards the first operator 686 on the vehicle bed 682 who can manually guide the fenestration product 690 during operation of the fenestration-lowering device 100.

With the fenestration product 690 supported on the upper support surface 122 of the support platform 120, the first operator 686 can actuate the first actuator 158 (shown in FIG. 1) located proximate to the upper frame member 104 (shown in FIG. 1). For example, the first operator 686 can actuate the first actuator 158 with their foot by stepping on the foot pedal 159. In aspects in which the first actuator 158 is located at a lower position on the frame 102, such as proximate to the lower frame member 106, a second operator (not shown) can stand on the ground surface 684 and can actuate the first actuator 158. Actuating the first actuator 158 can open the valve 146 (shown in FIG. 1) to release pressure in the hydraulic lowering mechanisms 130, which can allow the working fluid to flow from the lower reservoir 340 (shown in FIG. 3) to the upper reservoir 341 (shown in FIG. 3). The weight of the fenestration product 690 can force pistons 140 further into the corresponding chambers 338 (shown in FIG. 3), as described above, thus forcing the working fluid around the pistons 140 and into the upper reservoir 341.

As the pistons 140 move into the corresponding chambers 338, the crossbar 150 can slide downward along the first and second guide rods 156a,b. As described above, the crossbar 150 can be operatively coupled to the support platform 120, such that actuation of the hydraulic lower mechanisms 130 can cause the support platform 120 to move from the raised orientation to the lowered orientation. According to example aspects, the first operator 686 can manually stabilize the fenestration product 690 as the support platform 120 moves from the raised orientation to the lowered orientation.

FIG. 7 illustrates the support platform 120 in the lowered orientation. As shown, the fenestration product 690 can be lowered nearly to the ground surface 684 by the support platform 120. In example aspects, a second operator (not shown) can remove the fenestration product 690 from the support platform 120. In other aspects, the first operator 686 can step down from the vehicle bed 682 and can remove the fenestration product 690. According to example aspects, the valve 146 can be closed while the fenestration product 690 is removed to maintain the position of the support platform 120 during removal. Once the fenestration product 690 is removed, the first operator 686 or second operator can open the valve 146, and the compressed air within the spring return mechanism 160 can expand to return the support platform 120 to the raised orientation.

Thus, another method for operating the fenestration-lowering device 100 can comprise setting a fenestration product 690 on the support platform 120, actuating the first actuator 158 to move the support platform 120 from the raised orientation to the lowered orientation, and removing the fenestration product 690 from the support platform 120. In some aspects, the method can further comprise actuating the first actuator 158 to move the support platform 120 from the lowered orientation to the raised orientation.

The present fenestration-lowering device 100 can occupy a small amount of space and can be formed from lightweight materials and minimal components, such that the fenestration-lowering device 100 can be easily transported along with the fenestration product 690. In example aspects, the weight of the fenestration-lowering device 100 can be between about 20 and 50 pounds, and in a more particular aspect, the weight of the fenestration-lowering device 100 can be between about 30 and 40 pounds. As such, in various aspects, the fenestration-lowering device 100 can easily be manually carried and manipulated by a single operator (e.g., the first operator 686).

Providing the present fenestration-lowering device 100 can also eliminate the need for customers to own and operate their own equipment (such as a fork lift) to lower the fenestration product 690 from the delivery vehicle 680 to the ground surface 684. The present fenestration-lowering device 100 is also superior to equipment not specifically designed for such applications, in that it can lower the risk of injury associated with using inappropriate equipment to maneuver heavy objects. The fenestration-lowering device 100 further does not require a power source for operation, and as such, the need to charge and re-charge the fenestration-lowering device 100 is eliminated. Because there is no power required, the fenestration-lowering device 100 also cannot run out of power (e.g., batteries dying) during operation. Another benefit of the present fenestration-lowering device 100 is that its design can allow it to carry a significantly heavy fenestration product 690. In one example aspect, the fenestration-lowering device 100 can carry a weight of up to 450 pounds. The fenestration-lowering device 100 also does not need to be calibrated for fenestration products 690 of varying weights; rather, the fenestration-lowering device 100 can easily operate under weights between about 70-450 pounds.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A fenestration lowering device comprising:
   a frame;
   a support platform configured to move relative to the frame between a first orientation and a second orientation; and
   a hydraulic actuator configured to move the support platform from the first orientation to the second orientation; and
   a spring return actuator configured to move the support platform from the second orientation to the first orientation.

2. The fenestration-lowering device of claim 1, wherein the support platform comprises an upper support surface configured to support a fenestration product thereon and a pair of support mounts movably mounted to the frame.

3. The fenestration-lowering device of claim 1, wherein the hydraulic actuator comprises a cylinder and a piston, the cylinder defining a chamber configured to receive a working fluid, the piston configured to slide into and out of the chamber.

4. The fenestration-lowering device of claim 3, wherein the hydraulic actuator further comprises a valve, the valve configurable in an open position, wherein the working fluid is permitted to flow from a lower reservoir of the chamber to an upper reservoir of the chamber, and a closed position, wherein the working fluid is not permitted to flow from the lower reservoir to the upper reservoir.

5. The fenestration-lowering device of claim 1, further comprising one of a pedal, a button, a switch, and a knob that is configured to actuate the hydraulic actuator.

6. The fenestration-lowering device of claim 1, wherein the frame comprises:
   an upper frame member;
   a lower frame member; and
   a pair of side frame members extending between the upper frame member and lower frame member, wherein the support platform is movably mounted to the pair of side frame members.

7. The fenestration-lowering device of claim 6, further comprising a crossbar movably mounted to a pair of guide rods, each of the pair of guide rods extending between the lower frame member and the upper frame member.

8. The fenestration-lowering device of claim 7, wherein the hydraulic actuator extends between the lower frame member and the crossbar.

9. The fenestration-lowering device of claim 1, wherein the frame comprises a frame support configured to engage a support surface.

10. The fenestration-lowering device of claim 9, wherein the frame support is movable between a deployed orientation and a folded orientation.

11. The fenestration-lowering device of claim 1, wherein the support platform is operatively coupled to the hydraulic actuator by a pulley system, the pulley system comprising a series of pulleys and a cable engaging each of the pulleys.

12. A fenestration-lowering device comprising:
   a frame;
   a support platform configured to move relative to the frame between a raised orientation and a lowered orientation;
   a hydraulic lowering mechanism configured to move the support platform from the raised orientation to the lowered orientation; and
   a spring return mechanism configured to move the support platform from the lowered orientation to the raised orientation.

13. The fenestration-lowering device of claim 12, further comprising a first actuator for actuating the hydraulic lowering mechanism and the spring return mechanism.

14. The fenestration-lowering device of claim 12, wherein the spring return mechanism comprises a spring piston, a spring cylinder, and a gas housed within the spring cylinder.

15. The fenestration-lowering device of claim 14, wherein the gas can be compressed in the lowered orientation and expanded in the raised orientation.

16. A method for using a fenestration-lowering device comprising:
   providing a hydraulic lowering mechanism for moving a support platform of the fenestration-lowering device from a raised orientation to a lowered orientation;
   setting a fenestration product on the support platform in the raised orientation;
   activating the hydraulic lowering mechanism to move the support platform from the raised orientation to the lowered orientation;
   removing the fenestration product from the support platform; and
   activating a spring return mechanism to move the support platform from the lowered orientation to the raised orientation.

17. The method of claim 16, wherein activating the hydraulic lowering mechanism to move the support platform from the raised orientation to the lowered orientation comprises opening a valve, moving a working fluid from an lower reservoir of a cylinder of the hydraulic lowering mechanism to an upper reservoir of the cylinder, and receiving a piston of the hydraulic lowering mechanism within the cylinder.

18. The method of claim 17, wherein opening the valve comprises actuating a first actuator to move the valve from a closed position to an open position.

* * * * *